United States Patent [19]
Carroll

[11] Patent Number: 5,369,626
[45] Date of Patent: Nov. 29, 1994

[54] LIGHTNING PROTECTION FOR SEISMIC DATA ACQUISITION SYSTEM

[75] Inventor: Paul E. Carroll, Houston, Tex.

[73] Assignee: Input/Output, Inc., Stafford, Tex.

[21] Appl. No.: 81,401

[22] Filed: Jun. 22, 1993

[51] Int. Cl.$^5$ .................. H04R 11/00; H02H 9/04; H02H 3/20
[52] U.S. Cl. .................. 367/188; 361/119; 174/2; 174/6; 181/122
[58] Field of Search .................. 367/177, 182, 188; 181/122; 361/111, 117–119, 129; 174/2, 6

[56] References Cited

U.S. PATENT DOCUMENTS

| | | | |
|---|---|---|---|
| 1,311,063 | 7/1919 | Gabel | 361/119 |
| 4,253,131 | 2/1981 | Bosik et al. | 361/119 |
| 4,409,637 | 10/1983 | Block | 361/119 |
| 4,698,721 | 10/1987 | Warren | 361/110 |
| 4,999,729 | 3/1991 | Stifter | 361/111 |

FOREIGN PATENT DOCUMENTS

| | | | |
|---|---|---|---|
| 0666309 | 6/1977 | Japan | 361/119 |
| 1587681 | 4/1981 | United Kingdom | |

OTHER PUBLICATIONS

Fisher et al., 1970 Lightning and Static Electricity Conference, Dec. 11, 1970, pp. 309–161 USCL (317/61.5).

Primary Examiner—Nelson Moskowitz
Attorney, Agent, or Firm—Bush, Mosely & Riddle

[57] ABSTRACT

A lightning protection system is disclosed for a seismic data acquisition system having single or multiple geophones positioned at predetermined ground locations over a large area. A surge suppressor is placed across the leads to which the geophones strings are connected. Such surge suppressor preferably comprises a gas discharge arc tube. The base or spike of each geophone is implanted in the ground, A ground lead is connected to the surge suppressor. Electrical energy from a lightning strike affecting the geophones, cables, data acquisition boxes, etc. is dissipated by the surge suppressors through the multiple spikes to the earth thereby to minimize damage resulting from lightning.

7 Claims, 2 Drawing Sheets

LIGHTNING PROTECTION FOR SEISMIC DATA ACQUISITION SYSTEM

FIELD OF THE INVENTION

This invention relates to lightning protection for seismic data acquisition systems, and more particularly to lightning protection for a seismic data acquisition system in which sensors (such as geophones) positioned at predetermined ground locations are utilized.

BACKGROUND OF THE INVENTION

In seismic surveying, two types of acoustic detecting transducers are presently used: geophones on land and hydrophones in marine conditions and in mud-filled bore holes. Pressure sensitive phones are ideally suited for marine work as pressure changes above or below ambient water pressure are recorded. On land, pressure sensitive phones can not be used as it is generally impractical to bury the phones in such a way that they would have adequate fluid coupling with the surrounding material.

Acoustic energy generates signals and is normally created by explosives, mechanical wave generators provided by truck mounted vibrators, or rams engaging the ground surface. A geophone is designed to measure particle velocity by conversion to electrical energy. Although this specification will be described by reference to geophones as the preferred sensor for a land-based seismic data acquisition system, other sensors requiring protection against lightning strikes are part of the system to be protected of this invention.

It is important that good coupling be obtained between the ground surface and the geophones. The geophone case has a spike or other base attached to the geophone case for implantation within the earth's surface. The case encloses a magnet and surrounding coil. The coil may be fixed and the magnet suspended, or the coil may be suspended and the magnet fixed. Relative movement between the coil and the magnetic field of the magnet induces an electrical voltage which is transmitted and measured in a recording system. Geophones are usually deployed in groups at each detector location with series connected geophone groups connected in parallel to form a string. Each string is attached to a takeout in the main cable which feeds to a specific channel in the recording system. Frequently, several cables are deployed to adequately sample the signals from the earth. Thus, seismic signals are detected by arrays or single geophones, and field equipment is normally provided to record the reflected seismic signals. The field equipment typically includes remote acquisition electronics, telemetry and central control electronics for control, display and storage.

Three dimensional (3D) seismic data is collected by deploying multiple lines of sensors over a large area of the earth. The seismic reflections to points on the surface form a three dimensional array of data which enables a geophysicist or geologist to process such data to produce various displays of the sedimentary structures in the earth.

Large surface arrays to collect 3D seismic data may require many square miles of cables and geophones. The many miles of cables, such as, for example, fifty (50) miles of multi-conductor cable with geophone strings spread over ten (10) to fifteen (15) square miles, is quite vulnerable to lightning strikes. A direct lightning strike on a cable, a geophone string, or acquisition box will cause damage at the point of entry. The surge of electricity may travel along the cables to other parts of the array, damaging cables, sensors such as geophones and other equipment as it passes. Thus, it is desirable to minimize damage from any lightning strikes by limiting the propagation of current from a strike location to other parts of the system.

SUMMARY OF THE INVENTION

Geophone string wire normally has two or three leads for connection of the geophones in series or series parallel in a string of geophones. Strings of geophones are normally connected to a multiconductor cable for a data acquisition system. A geophone is mounted in a protective case to protect its velocity sensing mechanism and to make it easier to implant the case in the ground. The case normally has a removable base attached which comprises a spike, multiple spikes, or a flat base with short legs. The base for a geophone is normally electrically isolated from the internal velocity sensing mechanism of the geophone.

In order to dissipate a lightning strike over a relatively small area, it is desirable to have many points for dissipation of the electrical energy into the earth. This is accomplished according to the invention by providing a ground wire in the geophone string that connects all of the geophone spikes or bases together and thereby provides a multipoint earth ground. A surge suppressor is connected across the two output conductors of the geophone cable and also connected to the ground wire or conductor for the spikes. The use of a three element surge suppressor limits the voltage across the geophone string and discharges the surge suppressor current into what is usually a plurality of geophone spikes, thereby to minimize any damage to the geophone array and other parts of the system which might be electrically connected.

One embodiment of the invention provides one or more surge suppressor(s) within the cable or connector(s) of each geophone group with the surge suppressor grounded to geophone spikes or bases. The surge suppressors may be formed integrally with the takeout cable to the recording apparatus thereby to minimize the cost of the suppressors.

Another embodiment of the invention is provided by placing a surge suppressor directly across the conductors in a geophone string without connecting a separate ground or lead to the surge suppressor. Such surge suppressor preferably comprises a gas discharge arc tube or other type suppression device for the reduction of voltage to provide protection for the coils of the geophone in the event of lightning strikes. No modification to the geophone string is required with this embodiment, because the surge protector may be molded into the string connector or mounted elsewhere in the geophone string.

Another embodiment of the invention, particularly for use in a seismic telemetry cable, includes the addition of a ground conductor among the other conductors. Such ground conductor provides an improved path to ground where it is connected to a plurality of spikes of the arrays of geophones.

An object of this invention is to provide protection from lightning for seismic acquisition systems utilizing suitable ground connections for dissipation of the electrical energy from the lightning.

A further object of this invention is the protection from lightning for a seismic acquisition system having arrays of geophones over a large ground area and utilizing ground contacting bases of the geophones for dissipation of such electrical energy from the lightning in the event lightning strikes a cable, geophone string, or data acquisition box.

Other objects, features, and advantages of this invention will become more apparent after referring to the following specification and drawings.

DESCRIPTION OF THE INVENTION

Figure 1:
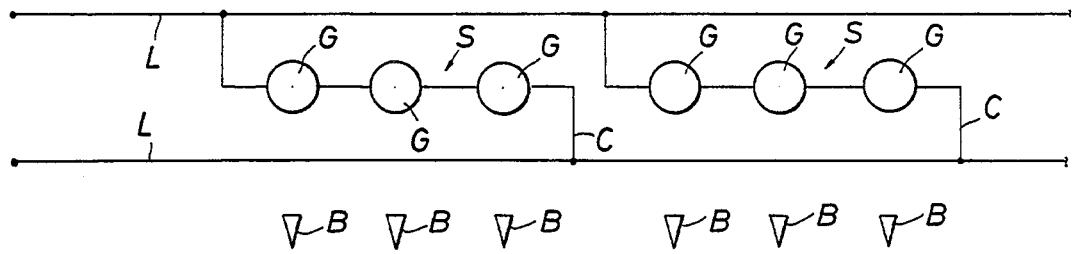
FIG. 1 is a schematic view of the prior art illustrating an array of geophones in a series/parallel arrangement and showing electrically isolated spikes of the geophones.

Referring to FIG. 1, an example of a prior art array of geophones (or other sensors) is illustrated including a conductor pair L of a multiconductor cable. Two sets S of series connected geophones G are connected in parallel across lead pair L. All six geophones connected as shown is known as a "string". Each geophone G includes an outer upper case containing the geophone electrical elements and an electrically isolated base B including a base or spike, which may be implanted in the ground at a predetermined ground location. A base is used where the spike can't be used, such as in rock or ice. Bases B are not connected to each other in any manner.

If lightning strikes a cable, geophone string, or data acquisition box, for example, damage may occur in the electrical system including the geophones, data acquisition box, and recording apparatus. While only a small portion of a seismic data acquisition system is shown in FIG. 1, it is to be understood, particularly when geophones are arranged over a surface area of the earth, that many miles of multiconductor cables spread over a large ground surface area. Thus, in the event of an electrical storm, a prior art seismic data acquisition system is vulnerable to direct or near lightning strikes on cables, geophone strings, and data acquisition boxes in the system, and damage could easily occur to such items and to items electrically connected to them as a result of such a lightning strike.

Figure 2:
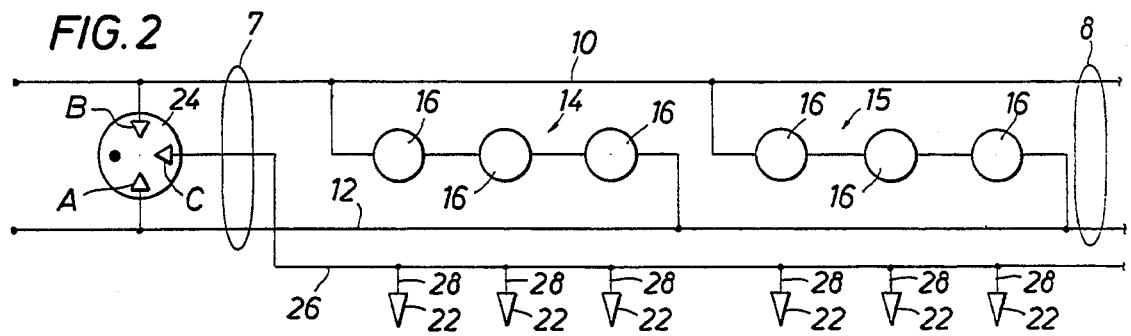
FIG. 2 is a schematic view of one embodiment of the invention in which a surge suppressor is placed across conductor pair leads to which geophones are connected electrically to a separate ground lead connected to spikes of the geophones for dissipation of electrical energy.

Referring to FIG. 2, an embodiment of the present invention is illustrated which provides lightning protection to the seismic data acquisition system to minimize damage to a large part of the system resulting from a direct or near lightning strike on the system, particularly the cables, geophone strings, or data acquisition boxes. Damage normally occurs at the point of entry and point of exit of the lightning strike against the system and frequently at many points in between. A multiconductor cable includes a conductor pair 8 comprising conductors 10, 12. Two series connected strings 14 and 15 of geophones 16 are connected in parallel across leads 10, 12.

Each geophone 16 has an outer case which houses the geophone electrical elements and an electrically isolated base including a spike 22 which may be driven within the ground surface for implanting the geophone. A spike 22 may include a plurality of spikes or a flat base or a flat base with legs or prongs, if desired.

A three element surge suppressor 24 is mounted across leads 10, 12 of the geophone string cable 7. A ground lead or conductor 26 from surge suppressor 24 is connected in parallel through conductors 28 to bases or spikes 22 to provide a multipoint dissipation of electrical energy into the ground if needed. Under normal voltages applied across leads 10, 12, surge suppressor 24 will not be energized enough to cause contact C to be electrically connected to contacts A and B. When a sufficiently extremely large voltage is applied across contacts A and B, A and C, or B and C, a gas within the tube is energized to a plasma state thereby reducing the impedance between contacts A, B and C. In other words, a low resistance electrical path is provided from leads 10 and 12 via contacts A and B to contact C and lead 26, and into the earth via the spikes.

Figure 3:
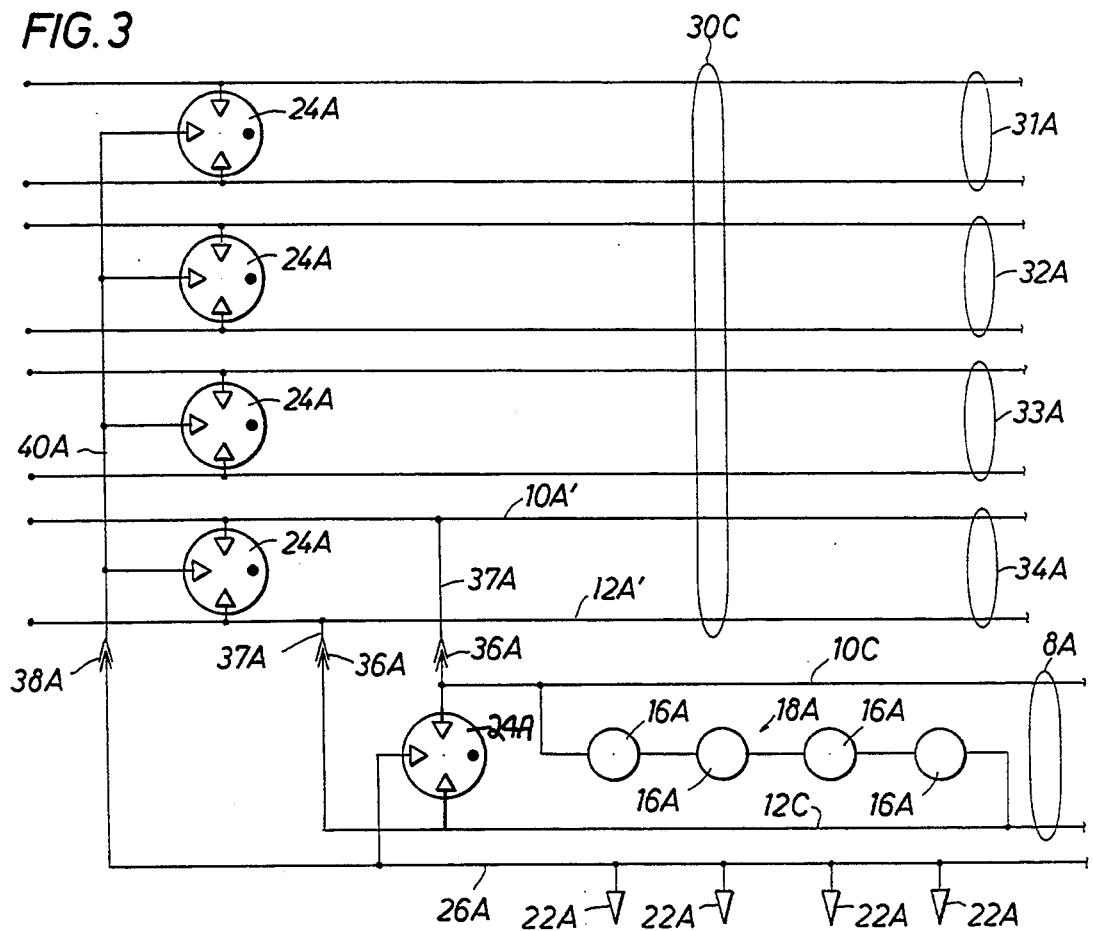
FIG. 3 is a schematic view of another embodiment of the invention including a multiconductor cable having four separate conductor pairs with a string of geophones attached to one pair and including a ground conductor connected to geophone spikes.

Referring now to FIG. 3, another embodiment of this invention is shown schematically in which a multiconductor cable 30C such as a cable to a recording apparatus is illustrated with four conductor pairs 31A, 32A, 33A and 34A therein. A geophone conductor pair 8A is connected to conductor pair 34A of multiconductor cable 30C through connectors 36A and leads 37A to conductors 10A' and 12A'. Geophone string 18A across leads 10C and 12C includes series connected geophones 16A. Spikes 22A are provided with each geophone 16A. Surge suppressors 24A are provided across each conductor pair 31A, 32A, 33A and 34A. A ground lead 26A connected to spikes 22A is connected to surge suppressors 24A for conductor pair 8A. Ground conductor 26A is also connected in parallel to surge suppressors 24A for conductor pairs 31A, 32A, 33A and 34A through connector 38A and lead 40A.

Thus, electrical energy from a lightning strike may be dissipated by spikes 22A from ground lead 26A to minimize any damage to conductor pairs 31A, 32B, 33A and 34A and the associated electrical equipment for takeout conductor pair 8A. Surge suppressor 24A preferably comprises a gas discharge arc tube which is triggered by peaks in line voltage. When the gas discharge arc tube triggers, the gas in the tube ionizes, the negative resistance phenomenon occurs, and the voltage across the tube drops to the glow voltage which may be around 70 volts. As the current through the gas discharge tube increases further, the tube is driven into its arc mode, and the voltage across the terminals of the discharge tube drops further. Surge suppressors 24A comprising gas arc tubes could be easily molded into takeout connector pair 8A thereby to provide a relatively inexpensive arrangement. Surge suppressor 24A for conductor pair 8A may be redundant and possibly be eliminated if desired, because surge suppressor 24A connected to conductors 10A', 12A' of conductor pair 34A may provide sufficient protection.

Figure 4:
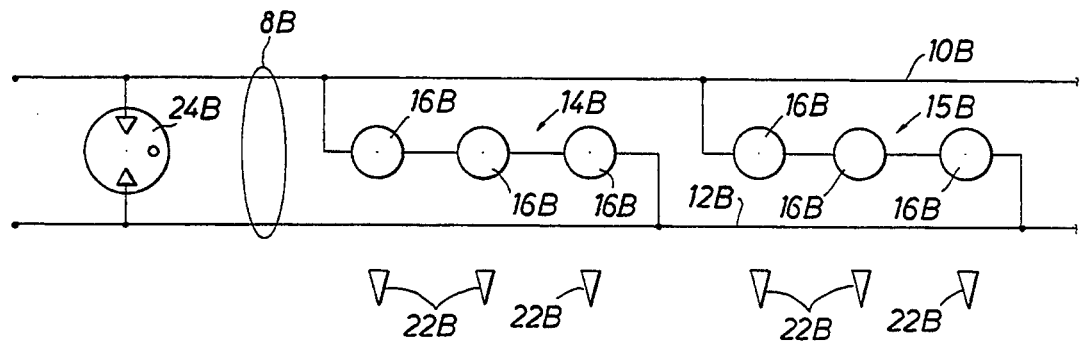
FIG. 4 is a schematic view of a further embodiment of this invention in which a surge suppressor is positioned across the leads of a geophone conductor pair without a separate ground lead connecting the spikes of the geophone.

Referring to FIG. 4, another embodiment of the invention is shown in which a surge suppressor 24B is positioned across leads 10B, 12B of conductor pair 8B. Strings 14B and 15B of series connected geophones 16B are provided across leads 10B and 12B. Surge suppressor 24B in this embodiment of the invention is a two element gas discharge arc tube (as distinguished from the three element tubes of FIGS. 2 and 3).

Other voltage suppression devices may be substituted for a discharge arc tube. Surge suppressor 24B minimizes damage to geophones 16B, particularly the coils of the geophones in the event of a lightning strike or the like. Spikes 22B are not electrically connected to surge suppressor 24B. Protection is not provided directly to ground at the geophones, but a low impedance path for the lightning surge is provided around the electrical components of the geophones. Such a simplified lightning protection system as shown in FIG. 4 can be inexpensively provided, because no modification for the conductors or leads of cable 8B is required. Surge suppressor 24B may be easily molded within connector pair 8B or the attached connector.

Figure 5:
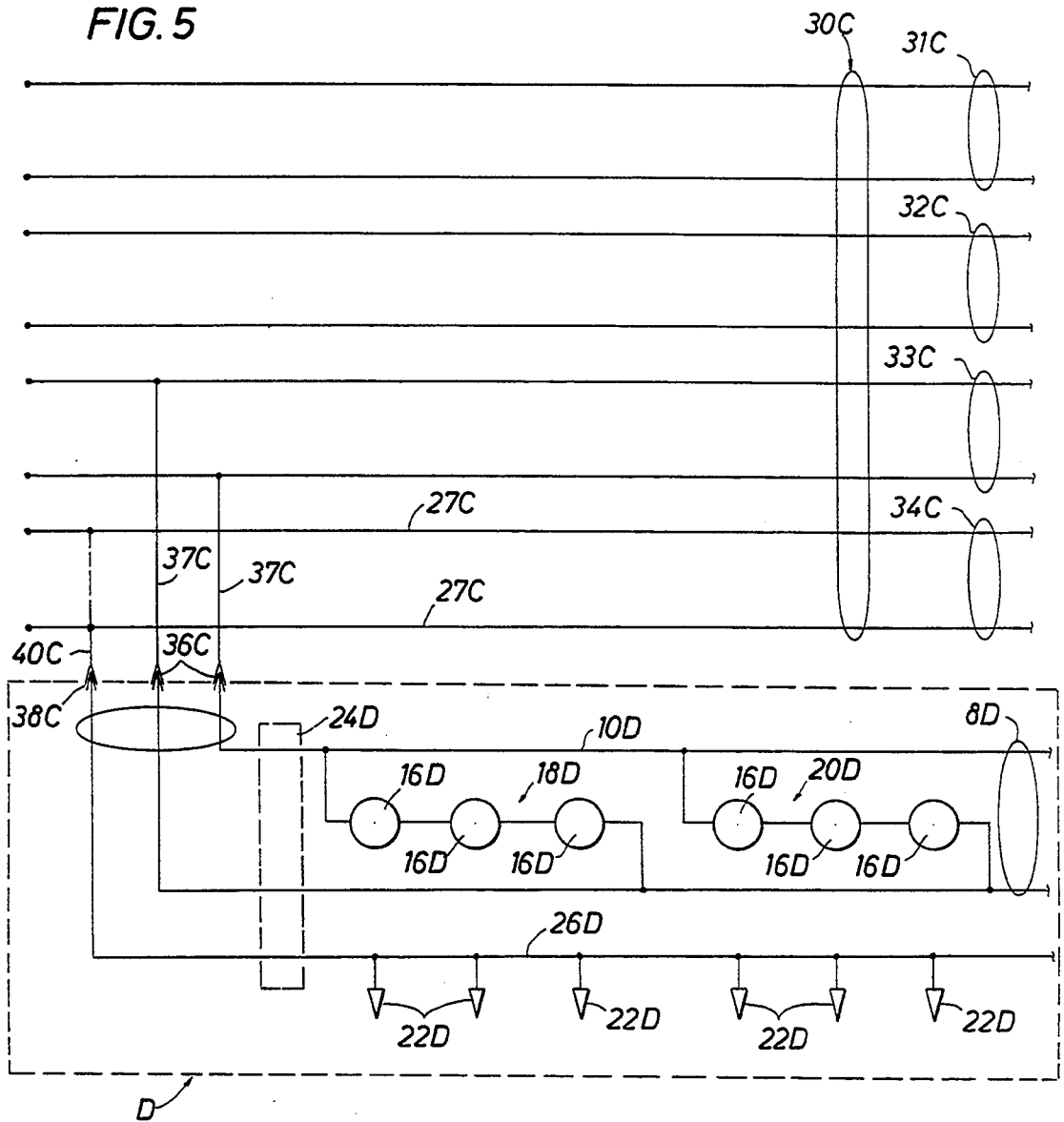
FIG. 5 is an additional modification of the invention in which a seismic telemetry cable has a plurality of cable pairs and in which a single (or multiple ground wires) is (are) connected to spikes of a string of geophones.

Referring now to FIG. 5, another alternative embodiment of the present invention is illustrated for use with a seismic telemetry cable as indicated generally at 30C which includes multiple conductor pairs 31C, 32C, 33C and 34C. Geophone strings consisting of series connected elements 18D & 20D are connected across leads 10D and 12D of conductor pair 8D. A surge suppressor 24D shown in broken lines may, if desired, be provided across leads 10D, 12D and lead 26D. Lead 26D is electrically connected to spikes 22D of one or more geophones 16D. Surge suppressor 24D may comprise a two element or three element suppressor device, such as a discharge arc tube. In some instances, it may be desirable not to utilize a surge suppressor. Connector(s) 36C connect leads 10D and 12D to conductor leads of pair 33C.

Telemetry cable 30C may have either one or multiple separate ground leads or drain leads 27C thereon. Ground leads 27C are connected by lead 40C and connector 38C to ground lead 26D and to geophone spikes 22D. By providing one or multiple ground leads in telemetry cable 30C to a plurality of geophone spikes 22D, lightning affecting cable 30C may be dissipated by spikes 22D before reaching data acquisition boxes or the like, thereby to minimize any damage resulting from lightning.

While preferred embodiments of the present invention have been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. An electric circuit protection device in combination with at least one sensor implanted within a predetermined ground area for a seismic data acquisition system, said at least one sensor including a cable having a pair of electrical leads connecting the sensor for providing seismic data to recording apparatus;

said protection device comprising a surge suppressor connected across said leads for limiting the electrical energy through said at least one sensor
wherein said at least one sensor has an electrically isolated base implanted within the ground area, and a ground lead connects said base to said surge suppressor for the dissipation of electrical energy into the ground area through said base.

2. An electric circuit protection device as set forth in claim 1 wherein said surge suppressor comprises a gas arc tube.

3. In an array of geophones connected by a conductor pair for providing seismic data in a seismic acquisition system for a predetermined ground area, each geophone having an outer case and an electrically isolated base connected to the case implanted within the ground area;
a lightning protection device for said array comprising a surge suppressor across the leads in said electrical cable; and
a ground lead connected to the bases of said geophones and to said surge suppressor for dissipating electrical energy into the ground area through said bases in the event of a lightning strike affecting said array.

4. In an array of geophones as set forth in claim 3 wherein a plurality of strings of geophones are provided with each string connected in series with or across a conductor pair;
a surge suppressor is connected across the leads of each of said conductor pair; and
said ground lead is connected to each of said surge suppressors for the dissipation of electrical energy into the ground area in the event of a lightning strike affecting any of said conductor pairs.

5. A seismic data acquisition circuit arrangement comprising,
a multiconductor seismic cable having a plurality of separate conductor pairs therein for geophones in a seismic acquisition system for a predetermined ground area;
a string of geophones electrically connected across one of said conductor pairs, each of said geophones in said string having an outer case and an electrically isolated lower base implanted in the ground area;
an electrical drain conductor in said multiconductor cable; and
a ground lead connected to the bases of said geophones and said electrical drain conductor for dissipating electrical energy through said bases in the event of a lightning strike affecting said seismic cable.

6. A multiconductor seismic cable as set forth in claim 5 wherein
a surge suppressor is placed across the leads of at least one of said conductor pairs; and
said ground lead is connected to a drain connection of said surge suppressor.

7. A multiconductor seismic cable as set forth in claim 6 wherein said surge suppressor comprises a gas arc tube.

* * * * *